L. T. BERTON.
MIRROR.
No. 182,633. Patented Sept. 26, 1876.
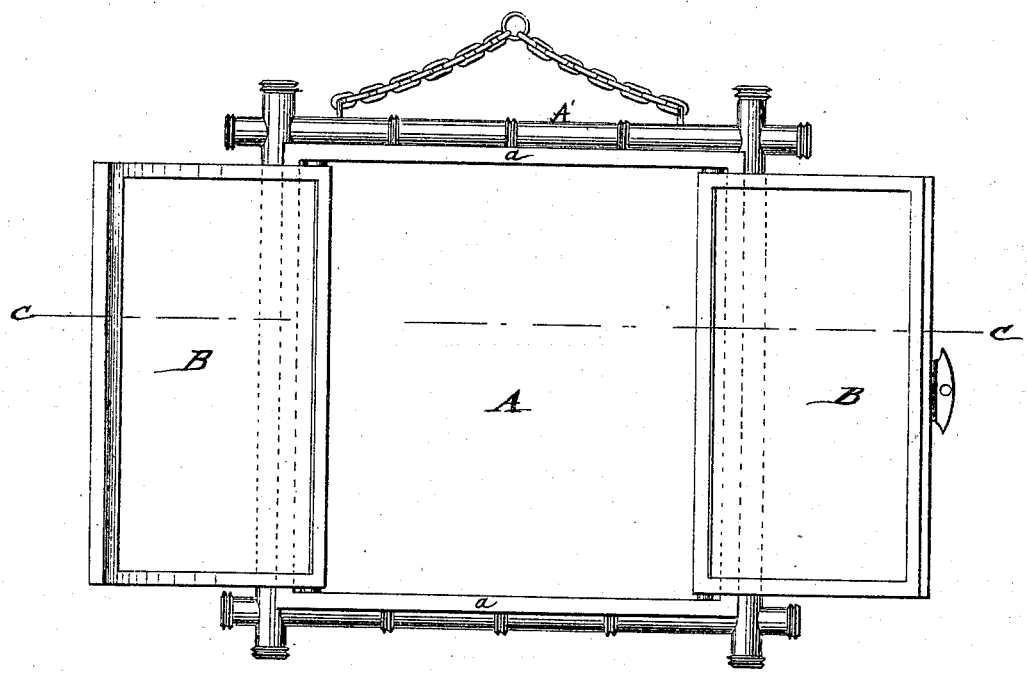
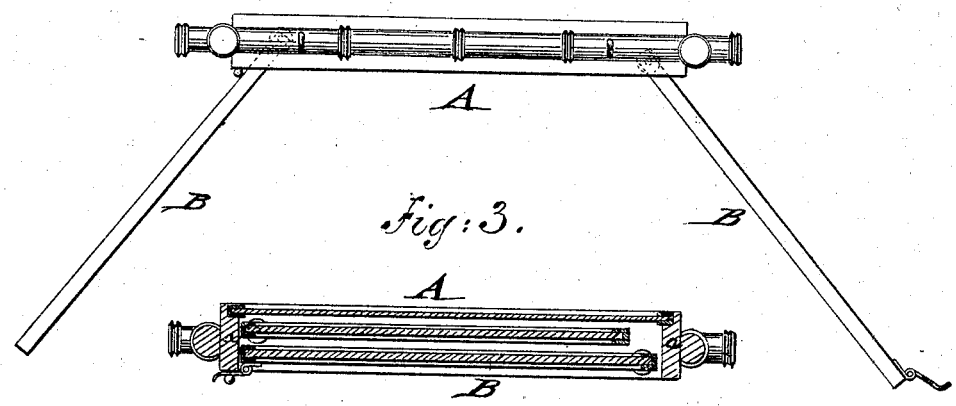

UNITED STATES PATENT OFFICE

LUDGER T. BERTON, OF PARIS, FRANCE, ASSIGNOR TO PIERRE LÉOPOLD BROT, OF SAME PLACE.

IMPROVEMENT IN MIRRORS.

Specification forming part of Letters Patent No. 182,633, dated September 26, 1876; application filed August 7, 1876.

*To all whom it may concern:*

Be it known that I, LUDGER TIBURCE BERTON, of Paris, France, have invented a new and Improved Mirror or Looking-Glass, of which the following is a specification:

This invention relates to an improved mirror or looking-glass by which the reflections may be multiplied, so that a person may see himself from several sides without change of position.

In the accompanying drawing, Figure 1 represents a front view, and Fig. 2 a plan view, of my improved mirror or looking-glass, shown with side mirrors or wings thrown open; and Fig. 3, a horizontal section of the same on line c c, Fig. 1, with wings closed.

Similar letters of reference indicate corresponding parts.

A represents the main glass, which is inclosed by inner frame a and the usual outer frame A'. To the upper and lower bars of frame a, but upon opposite sides, are pivoted the side glasses B, so that each will fold within the said frame, and one upon the other. The pivots are journaled in the upper and lower bars of frame a, at a short distance from the side bar, so that the latter will afford them support when the side glasses are opened out. This compound mirror is thus susceptible of being brought into a very compact and convenient form for transportation, or for being stowed away.

What I claim is—

A compound mirror formed of main glass having frame a, within which are hinged on opposite sides the glasses B, to fold within said frame, as shown and described.

LUDGER TIBURCE BERTON.

Witnesses:
 ROBT. M. HOOPER,
 FELIX ORET.